(12) United States Patent
Hung

(10) Patent No.: US 12,195,609 B2
(45) Date of Patent: Jan. 14, 2025

(54) RECLAIMED MATERIAL FOR MANUFACTURING SHOES AND METHOD OF PRODUCING RECLAIMED RUBBER BY PROCESSING RECYCLED SHOE MATERIAL WASTE

(71) Applicant: FENG TAY ENTERPRISES CO., LTD., Douliu (TW)

(72) Inventor: Chi-Yuan Hung, Tainan (TW)

(73) Assignee: FENG TAY ENTERPRISES CO., LTD., Douliu (TW)

( * ) Notice: Subject to any disclaimer, the term of this patent is extended or adjusted under 35 U.S.C. 154(b) by 673 days.

(21) Appl. No.: 17/488,871

(22) Filed: Sep. 29, 2021

(65) Prior Publication Data

US 2022/0403146 A1 Dec. 22, 2022

(30) Foreign Application Priority Data

Jun. 17, 2021 (TW) .................................. 110122139

(51) Int. Cl.
*C08L 17/00* (2006.01)
*B29B 17/04* (2006.01)
*C08K 3/36* (2006.01)
*A43B 1/12* (2006.01)

(52) U.S. Cl.
CPC .............. *C08L 17/00* (2013.01); *B29B 17/04* (2013.01); *B29B 17/0412* (2013.01); *C08K 3/36* (2013.01); *A43B 1/12* (2013.01)

(58) Field of Classification Search
CPC ..................................................... B29B 17/04
See application file for complete search history.

(56) References Cited

U.S. PATENT DOCUMENTS

| 5,770,632 A * | 6/1998 | Sekhar ...................... C08J 11/28 |
| | | 521/42 |
| 6,590,042 B1 * | 7/2003 | Tang ......................... C08J 11/28 |
| | | 525/353 |
| 2015/0197581 A1 * | 7/2015 | Asadauskas ............. C08K 5/20 |
| | | 252/182.13 |

FOREIGN PATENT DOCUMENTS

| CN | 101045799 A | 10/2007 |
| CN | 103980579 A | 8/2014 |
| CN | 109181041 A | 1/2019 |

OTHER PUBLICATIONS

Ishiaku et al, Polymer Testing, 18, 1999, 621-633 (Year: 1999).*
Lievana, Recycling of Ground Tyre Rubber and Polyolefin Wastes by Producing Thermoplastic Elastomers, Dissertation, 2005 (Year: 2005).*
Zhi-Hong Wu, Yao-Zu Wu, Ming-Cong Lu, Yi-Ting Wei, Continuous Unzipping Regeneration and Recycling Application of Waste Rubber Materials, Industrial materials, Mar. 5, 2020, No. 399 Material and Chemical Research Laboratories of Industrial Technology Research Institute, Hsinchu County.
Search report for TW110122139, Issued on Dec. 14, 2021, Total of 1 page.
English abstract for CN109181041, Total of 1 page.
English abstract for CN103980579, Total of 1 page.
English abstract for Zhi-Hong Wu, Yao-Zu Wu, Ming-Cong Lu, Yi-Ting Wei, Continuous Unzipping Regeneration and Recycling Application of Waste Rubber Materials, Industrial materials, Mar. 5, 2020, No. 399, Material and Chemical Research Laboratories of Industrial Technology Research Institute, Hsinchu County, Total of 1 page.
Search Report for TW111112077, Issued on Mar. 2, 2023, Total of 1 page.
Translation of Abstract of CN101045799, Total of 1 page.

* cited by examiner

*Primary Examiner* — Irina Krylova
(74) *Attorney, Agent, or Firm* — Apex Juris, pllc; Hilde Coeckx

(57) ABSTRACT

A method of producing a reclaimed rubber made of recycled shoe material waste includes the following steps. Step S1: collect a scrap rubber which is the shoe material waste. Step S2: grind the scrap rubber to form scrap rubber granules. Step S3: devulcanize the scrap rubber granules to form a reclaimed rubber. A reclaimed material for manufacturing shoes includes a reclaimed rubber formulation and a crosslinking agent, wherein the reclaimed rubber formulation is constituted by compounding a basic rubber formulation and the reclaimed rubber, wherein the reclaimed material for manufacturing shoes includes 65-94.8 wt % of the basic rubber formulation, 5-30 wt % of the reclaimed rubber, and 0.2 wt % to 5 wt % of crosslinking agent. Mechanical properties of the reclaimed material for manufacturing shoes meet required standards of shoe outsole material. A method of consuming rubber waste produced during the shoe manufacturing process is disclosed herein.

12 Claims, 5 Drawing Sheets

S3

S301 — Put scrap rubber granules and N, N'-Thio-bis(phthalimide) into Banbury mixer or two-roll mill to undergo first compound at 80-160 degrees Celsius for 5-30 minutes, thereby forming admixture, wherein derivatives of N, N'-Thio-bis(phthalimide) is substitutable for N, N'-Thio-bis(phthalimide)

S302 — Compound admixture again at 80-160 degrees Celsius for 20-60 minutes to form reclaimed rubber

RECLAIMED MATERIAL FOR MANUFACTURING SHOES AND METHOD OF PRODUCING RECLAIMED RUBBER BY PROCESSING RECYCLED SHOE MATERIAL WASTE

BACKGROUND OF THE INVENTION

Technical Field

The present invention relates generally to a technique of recycling shoe material waste, and more particularly to a reclaimed material for manufacturing shoes and a method of producing thereof by processing the recycled shoe material waste.

Description of Related Art

An outsole material needs to be comfortable and durable for wearing. A manufacturing process of the shoe outsole material needs to undergo a process of vulcanization to improve the performance of the outsole material. During the manufacturing process of the shoe outsole material, rubber waste is generated. A numerous amount of shoe outsole material is produced all over the world, so that a lot of rubber waste is generated every day, leading to environmental pollution.

So far, tire manufacturing industry has the most advanced recycling process of rubber waste. However, the required standards of the material for shoes are different from those of the material for tires. Therefore, a process for recycling the tire rubber waste that is disclosed by a tire manufacturer cannot be applied to the shoe industry. Therefore, the rubber waste generated during producing the shoe outsole material is unable to be recycled and reused efficiently.

Additionally, some of the shoe manufacturers grind the rubber waste into rubber powder and then add the rubber powder as a filler into an original rubber formulation to produce shoe outsole material, thereby achieving an efficacy of reuse. However, the vulcanized rubber powder is hard to crosslink with the unvulcanized rubber in the original rubber formulation. When the rubber powder is added too much, the mechanical properties of such shoe outsole material cannot meet the required standards of the general shoe outsole material. Thus, the shoe outsole material can only contain 3-5 wt % of the rubber powder based on a total weight of the shoe outsole material, which reduces the efficiency of recycling and reusing the rubber powder, so that the rubber waste generated during shoe production cannot be consumed effectively to achieve an objective of reducing rubber waste.

BRIEF SUMMARY OF THE INVENTION

In view of the above, the primary objective of the present invention is to provide a reclaimed material for manufacturing shoes and a method of producing thereof by processing recycled shoe material waste. The reclaimed rubber is obtained by devulcanizing the scrap rubber, which is produced exclusively in a shoe manufacturing process. The reclaimed rubber and a basic rubber formulation could be uniformly compounded to promote a content of the reclaimed rubber in the reclaimed material for manufacturing shoes. Additionally, mechanical properties of the reclaimed material for manufacturing shoes, including a hardness, a tearing strength, a tensile strength, an elongation at break, an abrasion resistance, and so on, meet the required standards of the shoe outsole material.

The inventive subject matter provides a method of producing a reclaimed rubber made of recycled shoe material waste, including the following steps.

Step S1: obtain a scrap rubber, which is produced exclusively in the shoe manufacturing process.

Step S2: shred the scrap rubber to form scrap rubber granules.

Step S3: make the scrap rubber granules undergo a devulcanization reaction to form a reclaimed rubber.

The inventive subject matter further provides a reclaimed material for manufacturing shoes including a reclaimed rubber formulation and a crosslinking agent, wherein the reclaimed rubber formulation containing a basic rubber formulation and the reclaimed rubber mentioned above. The basic rubber formulation is in a range of 65 wt % to 94.8 wt %, based on a total weight of the reclaimed material. The reclaimed rubber is in a range of 5 wt % to 30 wt %, based on the total weight of the reclaimed material. The crosslinking agent is in a range of 0.2 wt % to 5 wt %, based on the total weight of the reclaimed material. A total amount of the basic rubber formulation, the reclaimed rubber, and the crosslinking agent is equal to 100% of the reclaimed material.

The inventive subject matter further provides a method of consuming rubber waste produced during a shoe manufacturing process, including the following steps.

Step P1: collect a scrap rubber exclusively during the shoe manufacturing process.

Step P2: shred the scrap rubber to form scrap rubber granules;

Step P3: process the scrap rubber granules by a devulcanization reaction to form a reclaimed rubber.

Step P4: compound a reclaimed rubber formulation, which is constituted by compounding the reclaimed rubber and a basic rubber formulation, and a crosslinking agent, and then undergo a process of vulcanization to form a reclaimed material for manufacturing shoes. A content of the reclaimed rubber in the reclaimed material is in a range of 5 wt % to 30 wt %, based on a total weight of the reclaimed material.

With the aforementioned design, the method could be applied to the shoe manufacturing industry. Process the scrap rubber into the scrap rubber granules, and then devulcanize the scrap rubber granules to form the reclaimed rubber. Since the specific bonds (S—S bonds) of the scrap rubber are broken, and the backbone chain (C—C bonds) of the scrap rubber are retained during the process of devulcanization, the reclaimed rubber could have similar properties of the original unvulcanized rubber. Additionally, the reclaimed rubber and the basic rubber formulation could be compounded to produce the reclaimed material for manufacturing shoes. When the content of the reclaimed rubber is between 5 wt % and 30 wt %, based on the total weight of the reclaimed material for manufacturing shoes, the mechanical properties of the reclaimed material for manufacturing shoes fulfill the required standards of the shoe outsole material. Therefore, the reclaimed rubber produced by using the method provided in the present invention could be reused to produce the reclaimed material for manufacturing shoes, and the content of the reclaimed rubber in the reclaimed material for manufacturing shoes could be increased, thereby promoting the efficiency of consuming the rubber waste produced during shoe manufacturing process. Besides, the reclaimed material that contains high content of the reclaimed rubber could be reused in shoe production, thereby achieving a benefit of the circular economy.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
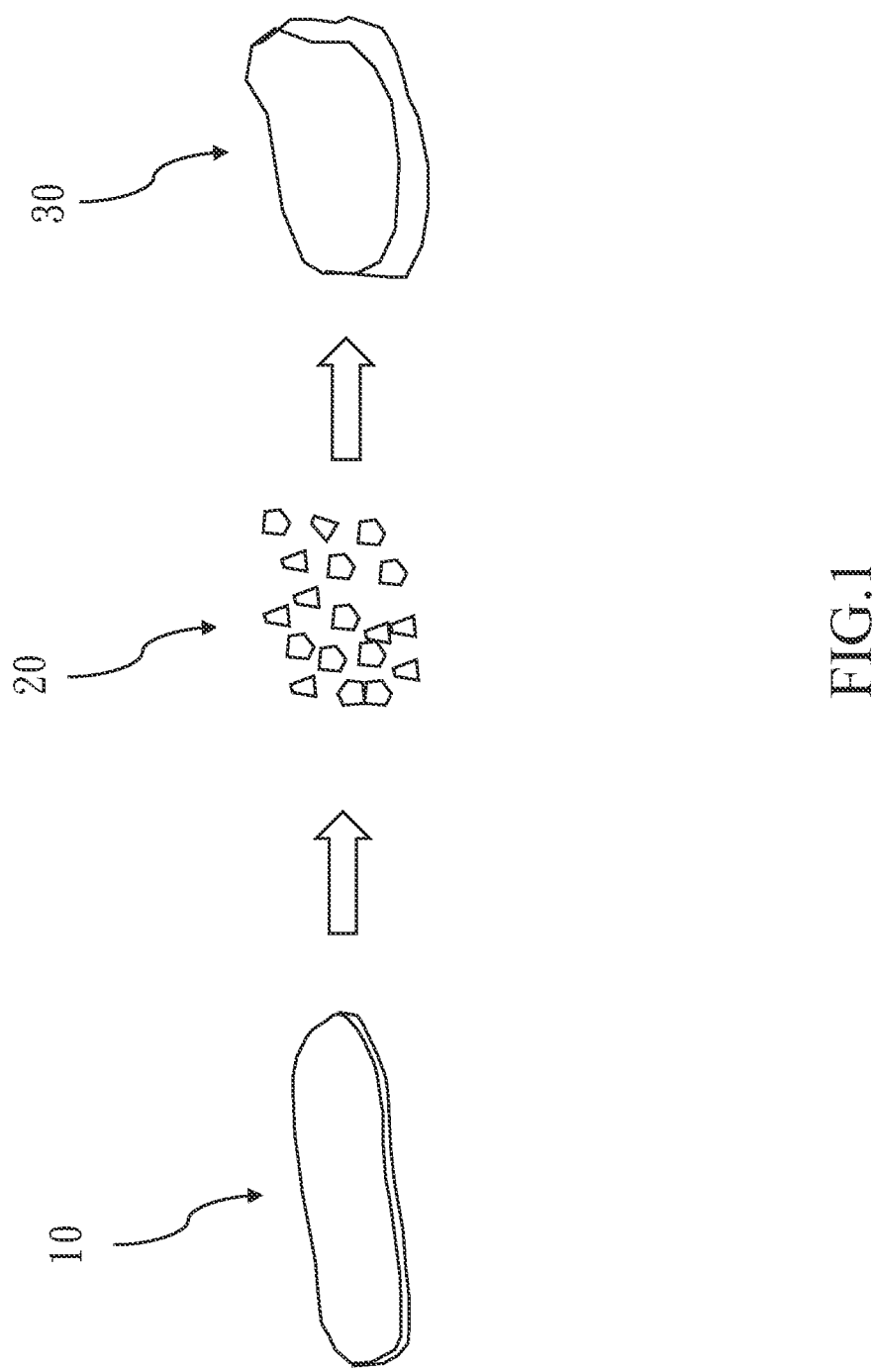
FIG. 1 is schematic diagram, demonstrating the process of producing the reclaimed rubber made of recycled shoe material waste of an embodiment according to the present invention.
Figure 2:
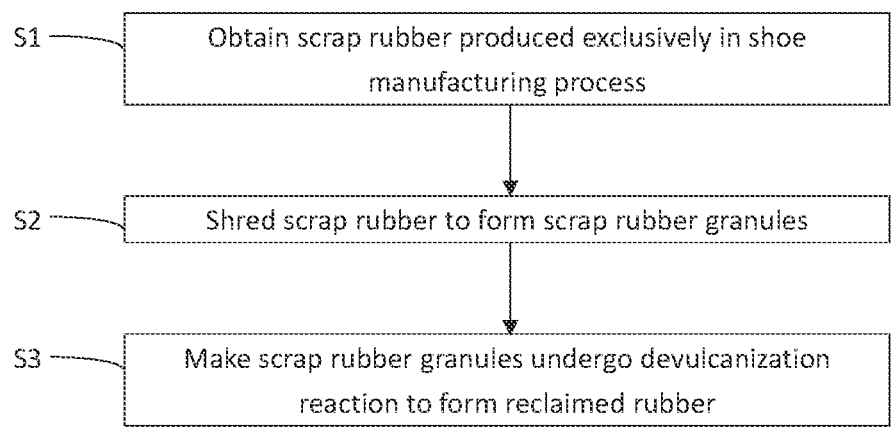
FIG. 2 is a flowchart, showing a method of producing the reclaimed rubber made of recycled shoe material waste of the embodiment according to the present invention.

As illustrated in FIG. 1 and FIG. 2, a method of producing a reclaimed rubber made of recycled shoe material waste of an embodiment according to the present invention includes the following steps:

Step S1: a scrap rubber 10, which is produced exclusively in a shoe manufacturing process, is obtained, wherein the scrap rubber 10 is a rubber waste produced during vulcanization of shoe outsole material.

Step S2: the scrap rubber 10 is shredded to form scrap rubber granules 20, wherein the scrap rubber granules 20 is a produced by a general apparatus for grinding, shredding, or crumbling. However, the scrap rubber granules 20 could also be produced or processed by other methods. In the current embodiment, a particle size of the scrap rubber granules 20 is smaller than or equal to 4 millimeters (mm). When the particle size of the scrap rubber granules 20 is greater than 4 mm, the particle size of scrap rubber granules 20 is too great, so that a surface area of the scrap rubber granules 20 is insufficient, leading to a low devulcanization reaction rate.

Step S3: the scrap rubber granules 20 undergoes a devulcanization reaction to form a reclaimed rubber 30, wherein a principle of the devulcanization reaction is breaking a part of specific polymer crosslinking chains (such as S—S bonds and S—C bonds) of the scrap rubber granules 20 by heating and mechanical shearing. In the step S3, the scrap rubber granules 20 undergo the devulcanization reaction at 60 to 190 degrees Celsius. More specifically, the reclaimed rubber 30 is produced by mixing and compounding the scrap rubber granules 20 and N,N'-Thio-bis(phthalimide). In other embodiment, the reclaimed rubber 30 is produced by mixing and compounding the scrap rubber granules 20 and derivatives of N,N'-Thio-bis(phthalimide). During the process of mixing and compounding, zinc oxide or magnesium oxide could be optionally added according to necessity. During the process of mixing and compounding, stearic acid or derivatives of stearic acid could be optionally added on the required demand. In the current embodiment, 100 parts of scrap rubber granules 20, 1 to 20 part(s) of N,N'-Thio-bis(phthalimide) or the derivatives of N, N'-Thio-bis(phthalimide), 0 to 5 part(s) of zinc oxide or magnesium oxide, and 0 to 5 part(s) of stearic acid or the derivatives of stearic acid by weight are mixed, wherein N,N'-Thio-bis(phthalimide) or the derivatives of N,N'-Thio-bis(phthalimide) could be Mediaplast 62 (the product of Kettlitz-Chemie GmbH & Co. KG), REGEN AGENT S (the product of SIN RUBTECH), or a combination thereof. In other embodiment, contents of ingredients of the reclaimed rubber 30, including the content of the scrap rubber granules 20, the content of N,N'-Thio-bis(phthalimide) or the derivatives of N,N'-Thio-bis(phthalimide), the content of stearic acid or the derivatives of stearic acid, the content of zinc oxide or magnesium oxide, could be properly adjusted on the required demand.

Additionally, in the step S3, the devulcanization of the scrap rubber granules 20 could be a batch devulcanization or a continuous devulcanization.

Figure 3:
FIG. 3 is a flowchart, showing the batch devulcanization of the method of producing the reclaimed rubber of the embodiment according to the present invention.

As illustrated in FIG. 3, the batch devulcanization includes the following steps:

Step S301: the scrap rubber granules 20 and N,N'-Thio-bis(phthalimide) are put into a Banbury mixer or a two-roll mill to undergo a first compound at 80-160 degrees Celsius for 5-30 minutes, thereby forming an admixture. In other embodiments, N,N'-Thio-bis(phthalimide) could be substituted with the derivatives of N,N'-Thio-bis(phthalimide). In other embodiments, additives could be added during the first compound, wherein the additives could be zinc oxide or magnesium oxide. Additionally, stearic acid or derivatives of stearic acid could be added during the first compound.

Step S302: the admixture is put into the Banbury mixer or the two-roll mill to undergo a second compound at 80-160 degrees Celsius for 20-60 minutes to form the reclaimed rubber 30.

Figure 4:
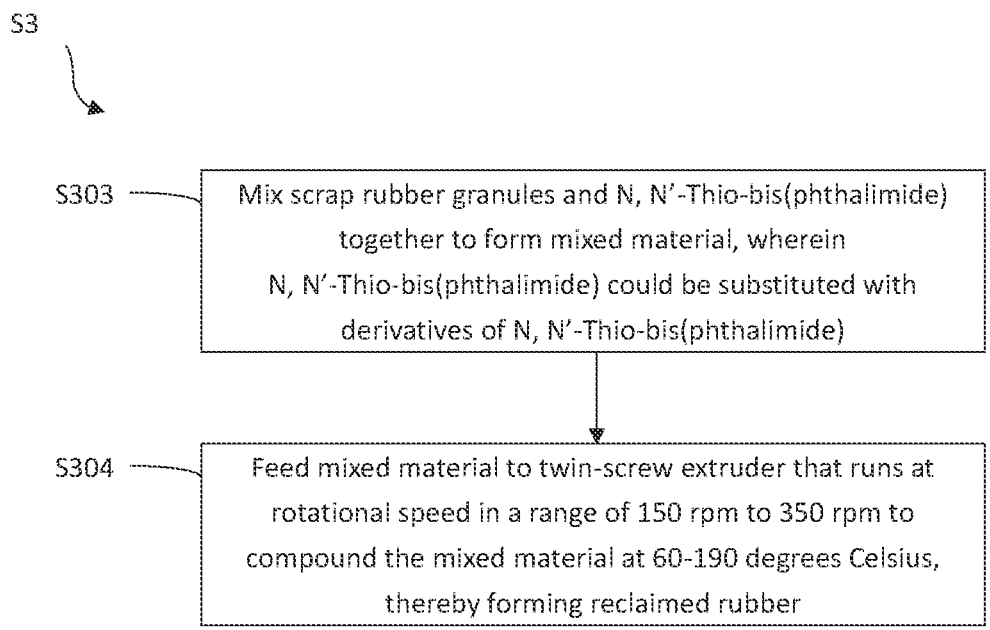
FIG. 4 is a flowchart, showing the continuous devulcanization of the method of producing the reclaimed rubber of the embodiment according to the present invention.

As illustrated in FIG. 4, the continuous devulcanization includes the following steps:

Step S303: the scrap rubber granules 20 and N,N'-Thio-bis(phthalimide) are mixed to form a mixed material, wherein N,N'-Thio-bis(phthalimide) could be substituted with the derivatives of N,N'-Thio-bis(phthalimide). In other embodiment, zinc oxide or magnesium oxide could be added during the mixing process. Moreover, stearic acid or the derivatives of stearic acid could be added during the mixing process.

Step S304: the mixed material is fed into a twin-screw extruder, wherein the twin-screw extruder runs at a rotational speed in a range of 150 rpm to 350 rpm to compound the mixed material at 60-190 degrees Celsius, thereby forming the reclaimed rubber 30. In the step S304, by shearing the mixed material via the twin-screw extruder, specific cross-links (e.g. S—S bonds) of the scrap rubber granules 20 are broken, but most of the backbone chains (C—C bonds) of the scrap rubber granules 20 are not broken, so that the reclaimed rubber 30 that is obtained has similar properties of original unvulcanized rubber.

A gel content of the reclaimed rubber 30 obtained through either the continuous devulcanization or the batch devulcanization is measured according to ASTM D2765. The reclaimed rubber 30 is subjected to a Soxhlet extractor with toluene as solvent for 24 hours to obtain the gel content of the reclaimed rubber 30. Generally, a gel content of uncrosslinked rubber is approximately 45%, and a gel content of crosslinked rubber is approximately 88%. The gel content of the reclaimed rubber 30 of the current embodiment preferably is in a range of 55% to 75%. It should be noted that when the gel content of the reclaimed rubber 30 is higher than 75%, it means the devulcanization efficiency of the reclaimed rubber 30 is not satisfactory, so as not to be able to maintain the processibility of the reclaimed rubber 30 for the reuse. When the gel content of the reclaimed rubber 30 is below 55%, backbone chains of the reclaimed rubber 30 are probably broken, leading to deteriorative physical properties.

Figure 5:
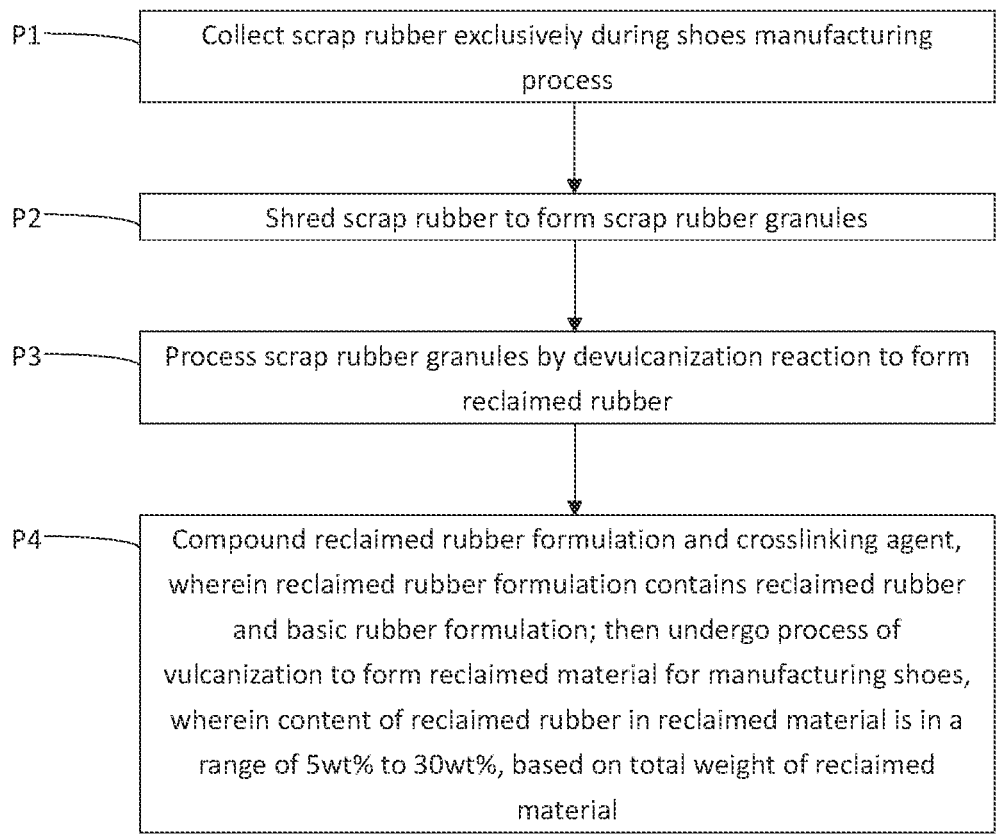
FIG. 5 is a flowchart, showing the method of consuming the rubber waste that is produced during shoe manufacturing process.

As illustrated in FIG. 1 and FIG. 5, a method of consuming the rubber waste produced during shoe manufacturing process of another embodiment according to present invention, includes the following steps:

Step P1: the scrap rubber 10 is collected exclusively during the shoe manufacturing process.

Step P2: the scrap rubber 10 is shredded to form the scrap rubber granules 20, wherein a method for shredding the scrap rubber 10 in the step P2 is the same as that in step S2 of the method of producing a reclaimed rubber of the embodiment mentioned above. A particle size of the scrap rubber granules 20 is smaller than or equal to 4 mm.

Step P3: the scrap rubber granules 20 undergo a devulcanization reaction to produce the reclaimed rubber 30, wherein a technique of the devulcanization reaction and a reaction temperature of the step P3 are the same as those in the step S3, thus the relative details are not described herein. A gel content of the reclaimed rubber 30 is measured according to ASTM D2765. The reclaimed rubber 30 is subjected to a Soxhlet extractor with toluene as solvent for 24 hours to obtain the gel content of the reclaimed rubber 30. The gel content of the reclaimed rubber 30 of the current embodiment preferably is in a range of 55% to 75%.

Step P4: the reclaimed rubber 30 is mixed with a basic rubber formulation to form a reclaimed rubber formulation. After the reclaimed rubber formulation and a crosslinking agent are compounded to undergo a process of vulcanization, a reclaimed material for manufacturing shoes is formed. In an embodiment, after the reclaimed rubber 30, the basic rubber formulation, and the crosslinking agent are compounded, the mixture is put into the hot-press mold to vulcanize at 140 to 160 degrees Celsius to form the reclaimed material for manufacturing shoes. In another embodiment, the basic rubber formulation includes a rubber material, silica, and an additive, wherein the rubber material, silica, and the additive are compounded to form the basic rubber formulation. After that, the basic rubber formulation is compounded with the reclaimed rubber 30 to form a reclaimed rubber formulation.

The reclaimed material for manufacturing shoes provided in another embodiment includes said reclaimed rubber formulation, which is constituted by the basic rubber formulation and said reclaimed rubber 30, and said crosslinking agent.

A content of the basic rubber formulation in the reclaimed material for manufacturing shoes is in a range from 94.8 wt % to 65 wt %. In the current embodiment, the basic rubber formulation includes 100 parts of the rubber material, 30 to 100 parts of silica ($SiO_2$), and 5 to 60 parts of the additive by weight. The additive is selected from a group including an antioxidant, a softener, an activator, zinc oxide, a silane coupling agent, an antifogging agent, and a combination thereof. However, the additive is not limited to the above-mentioned additives.

A content of the reclaimed rubber 30 in the reclaimed material for manufacturing shoes is in a range from 5 wt % to 30 wt %. In a preferred embodiment, the content of the reclaimed rubber 30 in the reclaimed material for manufacturing shoes is in a range from 15 wt % to 30 wt %.

A content of the crosslinking agent in the reclaimed material for manufacturing shoes is in a range from 0.2 wt % to 5 wt %. In the current embodiment, the crosslinking agent includes 0.1-4.9 wt % of sulfur and 0.1-4.9 wt % of vulcanization accelerator, wherein the vulcanization accelerator is selected from a group including 2,2'-dibenzothiazyl disulfide, tetrabenzyl thiuram disulfide, zinc dialkyldithiophosphate, diisopropyl xanthogen polysulphide, isopropylxanthic disulfide, thiurams, dithiocarbamates, sulphenamides, thiazoles, guanidines, thioureas, and a combination thereof. In the current embodiment, a total amount of the basic rubber formulation, the reclaimed rubber 30, and the crosslinking agent is equal to 100% of the reclaimed material.

The reclaimed rubber 30 is obtained by processing the scrap rubber 10 with the method of producing a reclaimed rubber made of recycled shoe material waste. By utilizing the method, the backbone chain (C—C bonds) of the scrap rubber 10 could be maintained, so that the reclaimed rubber 30 could have similar properties of original unvulcanized rubber. Thus, the reclaimed rubber 30 and the basic rubber formulation could be uniformly compounded to form the reclaimed rubber formulation, thereby increasing the content of the reclaimed rubber 30 in the reclaimed material for manufacturing shoes and reducing waste of the scrap rubber 10 to achieve the circular economy. When the content of the reclaimed rubber 30 in the reclaimed material for manufacturing shoes is between 5 wt % and 30 wt %, the reclaimed rubber formulation, which is formed by compounding the reclaimed rubber 30 and the basic rubber formulation, could be well-vulcanized. Therefore, the mechanical properties of the reclaimed material for manufacturing shoes that are measured could fulfill a requirement for shoe outsole material. On the contrary, when the content of the reclaimed rubber 30 in the reclaimed material for manufacturing shoes is greater than 30 wt %, the mechanical properties of the reclaimed material for manufacturing shoes are reduced. As a result, a part of the mechanical properties of the reclaimed material for manufacturing shoes, such as tensile strength and abrasion resistance, could not attain to the required standards for shoe outsole material. When the content of the reclaimed rubber 30 in the reclaimed material for manufacturing shoes is less than 5 wt %, the reclaimed rubber 30 could not efficiently consume the rubber waste generated during the shoe manufacturing process. Thus, the rubber waste during a rubber manufacturing process could not be reduced efficiently.

Additionally, a shoe outsole material of a comparative example 1 and reclaimed materials of experimental embodiments 1-4 are provided in the present invention, and the comparative example 1 and the experimental embodiments 1-4 are respectively measured to obtain the mechanical properties thereof.

Composition and Formula:

The comparative example 1 is the basic rubber formulation that includes 100 parts of the rubber material, 30 to 100 parts of silica, and 5 to 60 parts of additive by weight. The rubber material includes 50 to 80 parts of polybutadiene rubber (BR), 15 to 35 parts of natural rubber, and 5-15 parts of nitrile butadiene rubber (NBR) by weight. The additive is selected from a group including the antioxidant, the softener, the activator, zinc oxide, the silane coupling agent, the antifogging agent, and the combination thereof. However, the additive is not limited to the above-mentioned additives. After the basic rubber formulation is compounded with the crosslinking agent, a mixture of the basic rubber formulation and the crosslinking agent is vulcanized (cross-linked) at 140 to 160 degrees Celsius in the hot-press mold.

In the experimental embodiment 1, the reclaimed rubber formulation contains 85 wt % of a basic rubber formulation and 15 wt % of the reclaimed rubber 30. The basic rubber formulation includes 100 parts of the rubber material, 30 to 100 parts of silica, and 5 to 60 parts of additive by weight, wherein the rubber material includes 50 to 80 parts of polybutadiene rubber (BR), 15 to 35 parts of natural rubber, and 5-15 parts of nitrile butadiene rubber (NBR) by weight. The additive is selected from a group including the antioxidant, the softener, the activator, zinc oxide, the silane coupling agent, the antifogging agent, and the combination thereof. However, the additive is not limited to the above-mentioned additives. Said reclaimed rubber formulation and the crosslinking agent are compounded and put into the hot-press mold to undergo the vulcanization process (crosslink) at 140 to 160 degrees Celsius.

In the experimental embodiment 2, the reclaimed rubber formulation contains 80 wt % of a basic rubber formulation and 20 wt % of the reclaimed rubber 30. The basic rubber formulation includes 100 parts of the rubber material, 30 to 100 parts of silica, and 5 to 60 parts of additive by weight, wherein the rubber material includes 50 to 80 parts of polybutadiene rubber (BR), 15 to 35 parts of natural rubber, and 5-15 parts of nitrile butadiene rubber (NBR) by weight. The additive is selected from a group including the antioxidant, the softener, the activator, zinc oxide, the silane coupling agent, the antifogging agent, and the combination thereof. However, the additive is not limited to the above-mentioned additives. Said reclaimed rubber formulation and the crosslinking agent are compounded and put into the hot-press mold to undergo the vulcanization process (crosslink) at 140 to 160 degrees Celsius.

In the experimental embodiment 3, the reclaimed rubber formulation contains 70 wt % of a basic rubber formulation and 30 wt % of the reclaimed rubber 30. The basic rubber formulation includes 100 parts of the rubber material, 30 to 100 parts of silica, and 5 to 60 parts of additive by weight, wherein the rubber material includes 50 to 80 parts of polybutadiene rubber (BR), 15 to 35 parts of natural rubber, and 5-15 parts of nitrile butadiene rubber (NBR) by weight. The additive is selected from a group including the antioxidant, the softener, the activator, zinc oxide, the silane coupling agent, the antifogging agent, and the combination thereof. However, the additive is not limited to the above-mentioned additives. Said reclaimed rubber formulation and the crosslinking agent are compounded and put into the hot-press mold to undergo the vulcanization process (crosslink) at 140 to 160 degrees Celsius.

In the experimental embodiment 4, the reclaimed rubber formulation contains 50 wt % of a basic rubber formulation and 50 wt % of the reclaimed rubber 30. The basic rubber formulation includes 100 parts of the rubber material, 30 to 100 parts of silica, and 5 to 60 parts of additive by weight, wherein the rubber material includes 50 to 80 parts of polybutadiene rubber (BR), 15 to 35 parts of natural rubber, and 5-15 parts of nitrile butadiene rubber (NBR) by weight. The additive is selected from a group including the antioxidant, the softener, the activator, zinc oxide, the silane coupling agent, the antifogging agent, and the combination thereof. However, the additive is not limited to the above-mentioned additives. Said reclaimed rubber formulation and the crosslinking agent are compounded and put into the hot-press mold to undergo the vulcanization process (crosslink) at 140 to 160 degrees Celsius.

Mechanical properties measurement and measuring result:

The shoe outsole material of the comparative example 1 and the reclaimed materials of the experimental embodiments 1-4 for manufacturing shoes are measured by the following standards to obtain the mechanical properties of the materials. A hardness is measured according to ASTM D-2240, by a Shore A durometer. A tearing strength is measured by a tensile testing machine according to DIN 53507-A. A tensile strength is measured by the tensile testing machine according to DIN 53504. An elongation at break is measured by a tensile testing machine at an elongation rate of 200 mm/min according to DIN 53504. An abrasion resistance is measured by an abrasion tester according to DIN 53516. The measuring results are shown in the following table 1.

TABLE 1 the measuring results of the mechanical properties of the comparative example 1 and the experimental embodiments 1-4.

| Mechanical Properties | spec | Comparative Example 1 | Experimental Embodiment 1 | Experimental Embodiment 2 | Experimental Embodiment 3 | Experimental Embodiment 4 |
|---|---|---|---|---|---|---|
| Reclaimed rubber (wt %) in the reclaimed rubber formulation | spec | 0 | 15 | 20 | 30 | 50 |
| Hardness (A) | 65 ± 3 | 65.8 | 65 | 63.5 | 62.5 | 60 |
| Tearing Strength (N/mm) | ≥12 | 29.7 | 28.2 | 23.2 | 23.0 | 21.1 |
| Tensile Strength (MPa) | ≥14 | 22.4 | 17.3 | 18.4 | 15.8 | 12.5 |
| Elongation at break (%) | ≥400 | 678.4 | 620.9 | 606.0 | 524 | 552 |
| Abrasion Resistance (CBMM) | ≤80 | 39.0 | 56.4 | 54.3 | 78.1 | 86.6 |

More specifically, the mechanical properties of the shoe outsole material of the comparative example 1, including the hardness, the tearing strength, the tensile strength, the elongation at break, and the abrasion resistance, meet the criteria of material for shoes. The mechanical properties of the experimental embodiments 1-3 are close to those of the comparative example 1. The experimental embodiments 1-3 have the hardness between 62 and 68 according to ASTM D-2240, the tensile strength greater than or equal to 14 MPa according to DIN 53504, the elongation at break greater than or equal to 400% according to DIN 53504, the tearing strength greater than or equal to 12 N/mm according to DIN 53507-A, and the abrasion resistance smaller than or equal to 80 $mm^3$ according to DIN 53516. Therefore, the reclaimed materials of the experimental embodiments 1-3 meet required standards of the shoe outsole material, so that the reclaimed material of the experimental embodiments 1-3 could be utilized to manufacture shoes. Regarding the measuring result of the experimental embodiment 4, the hardness, the tensile strength, and the abrasion resistance of the experimental embodiment 4 do not meet the required standards of the shoe outsole material, so that the reclaimed material of the experimental embodiment 4 could not be used as the shoe outsole material.

Moreover, the present invention provides a shoe outsole material of a comparative example 2 and reclaimed materials of experimental embodiments 5-7, and compositions and mechanical properties of the comparative example 2 and the experimental embodiments 1~4 are respectively listed below.

Composition and Formula:

The comparative example 2 is the basic rubber formulation including 100 parts of the rubber material, 30 to 100 parts of silica, and 5 to 60 parts of additive by weight. The rubber material includes 70 to 90 parts of polybutadiene rubber (BR), 5 to 15 parts of natural rubber, and 5-15 parts of nitrile butadiene rubber (NBR) by weight. The additive is selected from a group including the antioxidant, the softener, the activator, zinc oxide, the silane coupling agent, the antifogging agent, and the combination thereof. However, the additive is not limited to the above-mentioned additives. After the basic rubber formulation is mixed with the crosslinking agent, a mixture of the basic rubber formulation and the crosslinking agent is vulcanized (cross-linked) at 140 to 160 degrees Celsius in the hot-press mold.

In the experimental embodiment 5, the reclaimed rubber formulation contains 80 wt % of a basic rubber formulation and 20 wt % of the reclaimed rubber 30. The basic rubber formulation includes 100 parts of the rubber material, 30 to 100 parts of silica, and 5 to 60 parts of additive by weight, wherein the rubber material includes 70 to 90 parts of polybutadiene rubber (BR), 5 to 15 parts of natural rubber, and 5-15 parts of nitrile butadiene rubber (NBR) by weight. The additive is selected from a group including the antioxidant, the softener, the activator, zinc oxide, the silane coupling agent, the antifogging agent, and the combination thereof. However, the additive is not limited to the above-mentioned additives. Said reclaimed rubber formulation and the crosslinking agent are compounded and put into the hot-press mold to be vulcanized (cross-linked) at 140 to 160 degrees Celsius.

In the experimental embodiment 6, the reclaimed rubber formulation contains 50 wt % of a basic rubber formulation and 50 wt % of the reclaimed rubber 30. The basic rubber formulation includes 100 parts of the rubber material, 30 to 100 parts of silica, and 5 to 60 parts of additive by weight, wherein the rubber material includes 70 to 90 parts of polybutadiene rubber (BR), 5 to 15 parts of natural rubber, and 5-15 parts of nitrile butadiene rubber (NBR) by weight. The additive is selected from a group including the antioxidant, the softener, the activator, zinc oxide, the silane coupling agent, the antifogging agent, and the combination thereof. However, the additive is not limited to the above-mentioned additives. Said reclaimed rubber formulation and the crosslinking agent are compounded and put into the hot-press mold to be vulcanized (cross-linked) at 140 to 160 degrees Celsius.

In the experimental embodiment 7, the reclaimed rubber formulation contains 85.3 wt % of a basic rubber formulation and 14.7 wt % of 40 mesh rubber particles. The basic rubber formulation includes 100 parts of the rubber material, 30 to 100 parts of silica, and 5 to 60 parts of additive by weight, wherein the rubber material includes 70 to 90 parts of polybutadiene rubber (BR), 5 to 15 parts of natural rubber, and 5-15 parts of nitrile butadiene rubber (NBR) by weight. The additive is selected from a group including the antioxidant, the softener, the activator, zinc oxide, the silane coupling agent, the antifogging agent, and the combination thereof. However, the additive is not limited to the above-mentioned additives. Said reclaimed rubber formulation and the crosslinking agent are compounded and put into the hot-press mold to be vulcanized (cross-linked) at 140 to 160 degrees Celsius.

Mechanical properties measurement and measuring result:

The shoe outsole material of the comparative example 2 and the reclaimed materials of the experimental embodiments 5-7 for manufacturing shoes are measured according to the following standards to obtain the mechanical properties of the materials. A hardness is measured according to ASTM D-2240, by a Shore A durometer. A tensile strength at 300% elongation is measured by a tensile testing machine at an elongation rate of 500 mm/min according to ASTM D412 (cutting die C). A tearing strength is measured by a tensile testing machine according to ASTM D624. A tensile strength is measured by a tensile testing machine according to ASTM D412 (cutting die C). An elongation at break is measured by a tensile testing machine at an elongation rate of 500 mm/min according to ASTM D412 (cutting die C). An abrasion resistance is measured by an Akron abrasion tester. The measuring results are shown in the following table 2.

TABLE 2 the measuring results of the mechanical properties of the comparative example 2 and the experimental embodiments 5-7.

| Mechanical Properties | spec | Comparative example 2 | Experimental embodiment 5 | Experimental embodiment 6 | Experimental embodiment 7 |
|---|---|---|---|---|---|
| Reclaimed rubber (wt %) in the reclaimed rubber formulation | spec | 0 | 20 | 50 | 0 |
| 40 mesh rubber particles (wt %) | | 0 | 0 | 0 | 14.7 |
| Hardness (A) | 67 ± 3 | 68-70 | 68-69 | 70-72 | 66-69 |
| Tensile strength at 300% elongation (kg/cm2) | ≥35 | 36.7 | 44.5 | 67 | 33.8 |
| Tearing Strength (kg/cm) | ≥35 | 55.8 | 50.3 | 43 | 45 |
| Tensile Strength (kg/cm2) | ≥100 | 150 | 140 | 93 | 120 |
| Elongation at break (%) | ≥550 | 746 | 669.3 | 394.8 | 678.8 |
| Abrasion Resistance (cc.) | ≤0.35 | 0.23 | 0.32 | — | 0.33 |

More specifically, the mechanical properties of the shoe outsole material of the comparative example 2, including the hardness, the tensile strength at 300% elongation, the tearing strength, the tensile strength, the elongation at break, and the abrasion resistance, meet criteria of material for shoes. The mechanical properties of the experimental embodiment 5 are close to those of the comparative example 2. The experimental embodiment 5 has the hardness between 68 and 70 according to ASTM D-2240, the tensile strength at 300% elongation greater than or equal to 35 kg/cm$^2$ according to ASTM D412 (cutting die C), the tensile strength greater than or equal to 100 kg/cm$^2$ according to ASTM D412 (cutting die C), the elongation at break greater than or equal to 550% according to ASTM D412 (cutting die C), the tearing strength greater than or equal to 35 kg/cm$^2$ according to ASTM D624, and the abrasion resistance smaller than or equal to 0.35 cc. according to Akron. Therefore, the reclaimed material of the experimental embodiment 5 meets required standards of the shoe outsole material, so that the reclaimed material of the experimental embodiment 5 could be utilized to manufacture shoes.

Comparing with the measuring result of the experimental embodiment 5, the measuring result of the experimental embodiment 6, including the hardness, the tensile strength, the elongation at break, and the abrasion resistance, does not meet the required standards of the shoe outsole material. Besides, comparing with the experimental embodiment 7 and the comparative example 2, additional 40 mesh rubber particles are added to the experimental embodiment 7. The measuring result of the experimental embodiment 7, the tensile strength at 300% elongation of the experimental embodiment 7 is smaller than 35 kg/cm$^2$, so that the shoe outsole material of the experimental embodiment 7 does not fulfill the required standards to the mechanical properties of the material for manufacturing shoes.

With such design, the method of producing the reclaimed rubber could be applied to the shoe manufacturing industry. The scrap rubber is processed to obtain the scrap rubber granules 20, and then the scrap rubber granules 20 undergo the devulcanization reaction to form the reclaimed rubber 30. Since only the specific cross-links (e.g. S—S bonds) are broken during the devulcanization of the scrap rubber granules 20, most of the backbone chain (C—C bonds) of the scrap rubber granules 20 are remained to make the reclaimed rubber 30 have the similar properties of the original unvulcanized rubber. Additionally, the reclaimed rubber 30 could be compounded with the basic rubber formulation to produce the reclaimed material for manufacturing shoes. As shown in table 1 and table 2, when the content of the reclaimed rubber 30 in the reclaimed material is between 5 wt % and 30 wt %, the mechanical properties of the reclaimed material fulfill the required standards of the shoe outsole material. Thus, the reclaimed rubber 30 produced by the method of the present invention could be reproduced to the reclaimed material for manufacturing shoes. Besides, by using the reclaimed rubber 30 produced by the method of the present invention, the content of the reclaimed rubber 30 in the reclaimed material for manufacturing shoes could be increased to efficiently reduce and consume the rubber waste during the manufacturing process of shoes, thereby achieving the object of reducing waste generated during the rubber manufacturing process of shoes. Additionally, the reclaimed material could be utilized for manufacturing shoes to achieve the circular economy.

It must be pointed out that the embodiment described above is only a preferred embodiment of the present invention. All equivalent composites and methods which employ the concepts disclosed in this specification and the appended claims should fall within the scope of the present invention.

What is claimed is:

1. A method of producing a reclaimed rubber made of recycled shoe material waste, comprising:
    step S1: obtaining a scrap rubber during a shoe manufacturing process, which is produced exclusively in the shoe manufacturing process, wherein the scrap rubber is a rubber waste produced during vulcanization of shoe outsole material;
    step S2: shredding the scrap rubber to form scrap rubber granules; and
    step S3: making the scrap rubber granules undergo a devulcanization reaction to form the reclaimed rubber, wherein the scrap rubber granules and N,N'-Thio-bis (phthalimide) undergo a first compounding process at 80-160 degrees Celsius to form an admixture, then the admixture undergoes a second compounding process at 80-160 degrees Celsius to form the reclaimed rubber; or wherein the scrap rubber granules and N,N'-Thio-bis(phthalimide) are mixed in a mixing process to form a mixed material, and wherein the mixed material is compounded by a twin-screw extruder running at a rotational speed in a range of 150 rpm to 350 rpm at 60-190 degrees Celsius to form the reclaimed rubber; and
    wherein the reclaimed rubber is subject to a Soxhlet extractor with toluene as solvent for 24 hours to obtain a gel content of the reclaimed rubber according to ASTM D2765, and the gel content of the reclaimed rubber is in a range of 55% to 75%.

2. The method as claimed in claim 1, wherein in the step S2, a particle size of the scrap rubber granules is smaller than or equal to 4 millimeters.

3. The method as claimed in claim 1, wherein 100 parts of the scrap rubber granules and 1 to 20 part(s) of the N,N'-Thio-bis(phthalimide) by weight are compounded.

4. The method as claimed in claim 1, wherein zinc oxide or magnesium oxide is added during the first compounding process, and stearic acid or derivatives of stearic acid added during the first compounding process.

5. The method as claimed in claim 1, wherein zinc oxide or magnesium oxide is added during the mixing process, and stearic acid or the derivatives of stearic acid added during the mixing process.

6. A reclaimed material for manufacturing shoes, comprising:
    a reclaimed rubber formulation including a basic rubber formulation and the reclaimed rubber produced by the method as claimed in claim 1, wherein the basic rubber formulation is in a range of 65 wt % to 94.8 wt %, based on a total weight of the reclaimed material, and the reclaimed rubber is in a range of 5 wt % to 30 wt %, based on a total weight of the reclaimed material, wherein the basic rubber formulation comprises 100 parts of rubber material, 30 to 100 parts of silica (SiO2), and 5 to 60 parts of an additive by weight;
    the additive is selected from the group consisting of an antioxidant, a softener, an activator, zinc oxide, a silane coupling agent, an antifogging agent, and a combination thereof; and
    wherein the rubber material includes 50 to 80 parts of polybutadiene rubber, 15 to 35 parts of natural rubber, and 5-15 parts of nitrile butadiene rubber by weight; and
    a crosslinking agent in a range of 0.2 wt % to 5 wt %, based on a total weight of the reclaimed material, wherein the reclaimed rubber formulation and the crosslinking agent are compounded to vulcanize, thereby forming the reclaimed material.

7. The reclaimed material as claimed in claim 6, wherein the crosslinking agent comprises 0.1-4.9 wt % of sulfur and 0.1-4.9 wt % of a vulcanization accelerator, based on the total weight of the reclaimed material.

8. The reclaimed material as claimed in claim 7, wherein the vulcanization accelerator is selected from the group consisting of 2,2'-dibenzothiazyl disulfide, tetrabenzyl thiuram disulfide, zinc dialkyldithiophosphate, diisopropyl xanthogen polysulphide, isopropylxanthic disulfide, thiurams, dithiocarbamates, sulphenamides, thiazoles, guanidines, thioureas, and a combination thereof.

9. The reclaimed material as claimed in claim 6, wherein the reclaimed material is measured by a tensile testing machine having an elongation rate of 200 mm/min according to DIN 53504; a tensile strength of the reclaimed material is greater than or equal to 14 MPa, and an elongation at break is greater than or equal to 400%.

10. The reclaimed material as claimed in claim 6, wherein the reclaimed material has a tearing strength greater than or equal to 12 N/mm in accordance with DIN 53507-A.

11. The reclaimed material as claimed in claim 6, wherein the reclaimed material is measured by a tensile testing machine having an elongation rate of 500 mm/min according to ASTM D412 (cutting die C); a tensile strength of the reclaimed material is greater than or equal to 100 kg/cm2; an elongation at break is greater than or equal to 550%; a tensile strength at 300% elongation is greater than or equal to 35 $kg/cm^2$.

12. The reclaimed material as claimed in claim 6, wherein the reclaimed material has a tearing strength that is greater than or equal to 35 $kg/cm^2$ in accordance with ASTM D624.

* * * * *